US011877581B2

United States Patent
Upston et al.

(10) Patent No.: US 11,877,581 B2
(45) Date of Patent: Jan. 23, 2024

(54) SMOKER GUN (71) Applicant: BREVILLE PTY LIMITED, Alexandria (AU)

(72) Inventors: Greg Upston, Ridgewood (AU); Vyvyan Rose, Bronte (AU)

(73) Assignee: BREVILLE PTY LIMITED, Alexandria (AU)

( * ) Notice: Subject to any disclaimer, the term of this patent is extended or adjusted under 35 U.S.C. 154(b) by 1235 days.

(21) Appl. No.: 16/332,305

(22) PCT Filed: Sep. 7, 2017

(86) PCT No.: PCT/AU2017/000188
§ 371 (c)(1),
(2) Date: Mar. 11, 2019

(87) PCT Pub. No.: WO2018/053569
PCT Pub. Date: Mar. 29, 2018

(65) Prior Publication Data
US 2019/0230946 A1 Aug. 1, 2019

(30) Foreign Application Priority Data

Sep. 20, 2016 (AU) ................................ 2016903792

(51) Int. Cl.
*A23B 4/052* (2006.01)
(52) U.S. Cl.
CPC .......... *A23B 4/052* (2013.01); *A23V 2002/00* (2013.01)
(58) Field of Classification Search
CPC ................................ A23B 4/052; A23B 4/044
See application file for complete search history.

(56) References Cited

U.S. PATENT DOCUMENTS

| 4,097,227 A | | 6/1978 | Brock | |
|---|---|---|---|---|
| 4,164,230 A | * | 8/1979 | Pearlman | A24F 1/22 131/330 |
| 4,374,489 A | * | 2/1983 | Robbins | A23B 4/0523 126/41 R |
| 4,934,260 A | | 6/1990 | Blevins | |
| 4,934,272 A | | 6/1990 | Sternin et al. | |
| 5,069,230 A | * | 12/1991 | Green | F23B 1/38 131/330 |

(Continued)

FOREIGN PATENT DOCUMENTS

| RU | 653346 U | 8/2007 |
|---|---|---|
| RU | 163571 | 7/2016 |

OTHER PUBLICATIONS

Date for smoking gun manual cited on Applicant's IDS (Year: 2012).*

(Continued)

*Primary Examiner* — Erin McGrath
(74) *Attorney, Agent, or Firm* — MOSER TABOADA (57) ABSTRACT

A smoking appliance in the form of a smoker gun. The appliance includes a major body portion (111) that releasably receives a barrel. The barrel provides an air flow passage that extends from an inlet opening to an outlet opening. Mounted in the barrel is a combustion bowl having an opening through which smoke is delivered to the air flow passage. A motor and impeller driven thereby causes air to flow along the air flow passage.

11 Claims, 9 Drawing Sheets

(56) References Cited

U.S. PATENT DOCUMENTS

2008/0029107 A1* 2/2008 Ruff .................. A24F 1/30
                                                    131/335
2008/0072917 A1* 3/2008 Lee .................... A24F 1/30
                                                    131/330
2013/0011535 A1    1/2013 Mafi

OTHER PUBLICATIONS

Extended European Search Report for EP 17851971.6, dated Nov. 15, 2019.
Search Report for RU 2019102065, dated Jul. 8, 2019.
Liu, Kevin. Hack Together a DIY Cold Smoker Gun for Less than $20. [Retrieved from the internet on Sep. 28, 2017] <URL: http://web. archive. org/web/20130212055411/http://sciencefare <http://web.archive.org/web/20130212055411/http://sciencefare>. org/2011/11/03/( iy-gun-cold- smoker> published on Nov. 3, 2011 as per document and Wayback Machine. see whole document.
PolyScience. The Smoking Gun Handheld food smoker. [Retrieved from the internet on Oct. 12, 2017] <URL: http://web. archive. org/web/20150316065145/http://po <http://web.archive.org/web/20150316065145/http://po> lysc ienc eculinary. com/blo <http://eculinary.com/blo> g/wp-content/uploads/2012/07/Smoking-Gun-Manual.pdf> published Mar. 16, 2015 see whole document.
International Search Report and Written Opinion for PCT/AU2017/000188, dated Oct. 16, 2017.
Smoking Gun_SD Video, https://v.youxu.com/v_show/id_XMTMwNIQ5MiM0NA==html, Uploaded at Aug. 10, 2015 23:45.

* cited by examiner

SMOKER GUN

FIELD

The technology relates to food smoking and more particularly to an appliance for food smoking.

BACKGROUND OF THE INVENTION

Smoking is a flavouring process for food. Smoking a food flavours it by exposing it to the combustion products of a burning or smouldering material. In conventional smoking, the smoking material is wood, in the form of pieces, splinters, chips, flakes or particles. Popular smoking woods include hickory, mesquite, apple and cherry. Fuels other than wood can be used. Wood and other fuels may also be enhanced with the addition of additional flavouring ingredients.

Cold smoking does not cook food. Traditional cold smoking is done in a smokehouse, essentially at room temperature (20-30 C). In this temperature range, foods lose little moisture during the smoking process. The cold smoking process can be adapted to a domestic kitchen environment with an appliance. A smoking appliance produces smoke that can be dispensed into a container. Food in the container becomes exposed to the smoke and acquires the flavour of the smoke.

Although domestic smoking appliances are usually used with cold smoking, they may also be used in hot smoking. Hot smoking cooks in a heated smoky environment.

A smoking appliance may have a chamber for holding the smoking material. The chamber must be removed and cleaned regularly and is subject to high temperatures. A disadvantage of some smoking appliances is that heat sensitive materials in the appliance are not isolated from high temperatures in the smoking material container.

A further disadvantage of know smoking appliances is that surfaces of the appliances are exposed to that smoke accumulate resin, which surfaces are difficult to clean.

OBJECT

It is the object of the present invention to overcome or at least substantially ameliorate at least one of the above disadvantages.

SUMMARY OF INVENTION

There is disclosed herein a smoker appliance including
a body assembly providing an air flow path extending between an air inlet opening and an air outlet opening, a combustion bowl mounted in the body assembly and having a combustion space to receive material to be burnt to provide smoke, the bowl having a bowl opening providing for the flow of smoke from the combustion space to the path;
a motor and air flow generator mounted on the body assembly, the air flow generator being operable to cause air to pass along the path from the inlet opening to the outlet opening and thereby draw smoke from the combustion space into the path for delivery to the outlet opening; and wherein
the bowl has a side wall, and the body assembly a side wall that surrounds a port within which the bowl is received, with the body assembly side wall and bowl side wall being spaced so as to provide an insulation space between the body assembly side wall and the bowl side wall to inhibit the transfer of heat from the bowl to the body assembly.

Preferably, the insulation space surrounds the bowl.

Preferably, the bowl is removably mounted in the port.

Preferably, the appliance includes a clip releasably securing the bowl to the body wall.

Preferably, the body assembly includes a body portion within which the motor is located, and a barrel attached to the body portion, with the barrel having the port, flow path, inlet opening and outlet opening.

Preferably, the barrel is removably attached to the body portion.

Preferably, the body portion has a longitudinal axis, with the barrel moved angularly about said axis for attachment and removal with respect to the body portion.

Preferably, a seal connects the body portion and the barrel to at least inhibit smoke escaping from the air flow path.

Preferably, the motor and air flow generator have a rotational axis, with the flow path including a first passage extending from the inlet opening to the air flow generator, and a second passage extending from the air flow generator to the outlet opening, with each of the passages having a major direction of extension generally parallel to said rotational axis.

Preferably, the insulation space communicates with the first passage to provide for air flow through the insulation space to the first passage.

Preferably, the appliance has a base upon which the appliance can rest on a generally horizontal surface, so as to extend upwardly from the horizontal surface with the second passage having a portion adjacent the air flow generator, and with the second passage portion being located below the air flow generator.

The appliance of claim 11, wherein the second passage portion is located at least partly lower than the outlet opening, when the appliance is resting on the generally horizontal surface.

Preferably, the bowl opening communicates with the first passage.

There is further disclosed herein a smoker appliance including:
a body assembly including a body portion, having an end extremity, and a barrel removably attached to the body portion with the end extremity projecting into the barrel, and a combustion bowl mounted in the barrel, the bowl having a combustion space to receive material to be burnt to provide smoke, the bowl also having a bowl opening providing for the flow of smoke from the combustion space, with the barrel providing an air flow path extending from an air inlet opening to an air outlet opening and communicating with the bowl opening so that smoke can enter the air flow path from the combustion space, and a seal connecting the barrel and body portion by being located between the barrel and end extremity;
a motor and air flow generator operatively associated with the flow path to cause air to pass from the inlet opening to the outlet opening and therefore draw smoke into the air flow path through the bowl opening; and wherein
the seal sealingly connects the barrel with the body portion to at least inhibit passage of smoke escaping the air flow path.

Preferably, the seal at least aids in spacing the barrel from the end extremity.

Preferably, the motor and air flow generator have a rotational axis, with the barrel attached and removed by angular movement of the barrel about said axis relative to said body portion.

Preferably, the bowl has a side wall, and the barrel a side wall that surrounds a port within which the bowl is located, with the barrel side wall and bowl side wall being spaced so as to provide an insulation space between the barrel side wall and the bowl side wall to at least inhibit the transfer of heat from the barrel to the body portion.

Preferably, the insulation space surrounds the bowl.

Preferably, the bowl is removably mounted in the port.

Preferably, the appliance includes a clip releasably securing the bowl to the body wall.

Preferably, the flow path includes a first passage extending from the inlet opening to the air flow generator, and a second passage extending from the air flow generator to the outlet opening, with a portion of the second passage being located adjacent the air flow generator but spaced further from the axis than the air flow generator.

Preferably, the appliance includes a base upon which the appliance can rest on a generally horizontal surface, so as to extend upwardly from the horizontal surface with the second passage portion being located below the air flow generator.

Preferably, the second passage portion is at least partly lower than the outlet opening when the appliance is mounted on the generally horizontal surface.

There is still further disclosed herein a smoker appliance including:
- a body assembly including a body portion and a barrel, the barrel providing an air flow path extending between an air inlet opening and an air outlet opening, and a bowl to receive a material to be burnt to provide smoke, the bowl being mounted in the barrel and having a bowl opening to provide for the flow of smoke from the bowl to the air flow path;
- a motor and air flow generator, the motor and air flow having a rotational axis, with the air flow generator being operatively associated with the flow path to cause air to flow along the air flow path from the inlet opening to the outlet opening and therefore draw smoke into the flow path via the bowl opening; and wherein
- the flow path includes a first passage extending from the inlet opening to the air flow generator, and a second passage extending from the air flow generator to the outlet opening, with a portion of the second passage being located adjacent the air flow generator but spaced further from the axis than the air flow generator.

Preferably, the body assembly includes a base upon which the appliance can rest on a generally horizontal surface so as to extend upwardly therefrom, with the second passage portion located below the air flow generator.

Preferably, the second passage portion is at least partly lower than the outlet opening, when the appliance is mounted on the generally horizontal surface.

Preferably, the second passage diverges from said axis away from said air flow generator.

Preferably, the appliance has a grip that is engaged by a user to manipulate the appliance, and wherein the grip has a longitudinal axis generally transverse relative to said axis so that the appliance can be gripped in a pistol grip manner.

Preferably, the appliance has a grip that is engaged by a user to manipulate the appliance, and wherein the grip has a longitudinal axis generally transverse relative to said rotational axis so that the appliance can be gripped in a pistol grip manner.

BRIEF DESCRIPTION OF THE DRAWINGS

Preferred forms of the present invention will now be described by way of example with reference to the accompanying drawings wherein.

DESCRIPTION OF EMBODIMENTS

Figure 1:
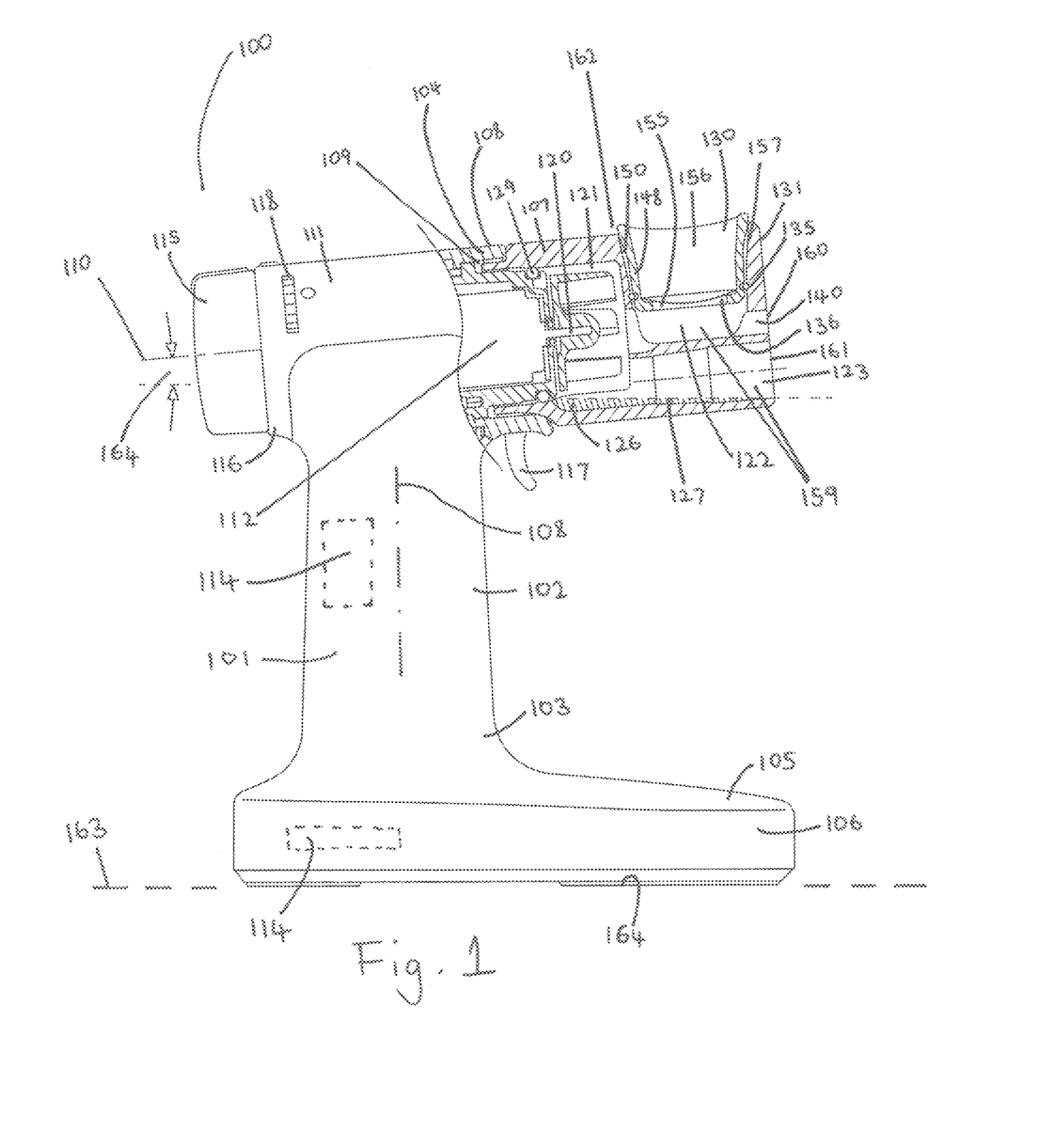
FIG. 1 is a side elevation of a smoker gun, partially cross-sectioned.

A smoking appliance 100 is shown in FIG. 1. In this instance, the appliance 100 is shaped to form a smoker gun 101. The appliance 100 has a backwardly inclined grip 102. The bottom 103 of the grip 102 blends into the base 105 to form a continuous major body portion 111, that includes the upper body 240 (see FIG. 2). The foot 106 (base) of the base extends away from the grip 102 in the same direction as the removable barrel 107. The base 105 may take other shapes, for example being radially symmetrical, or a tripod. In the example of FIG. 1 the base is asymmetrical (leaning rearward in side view) with respect to a centre line 108 of the grip 102.

Figure 10:
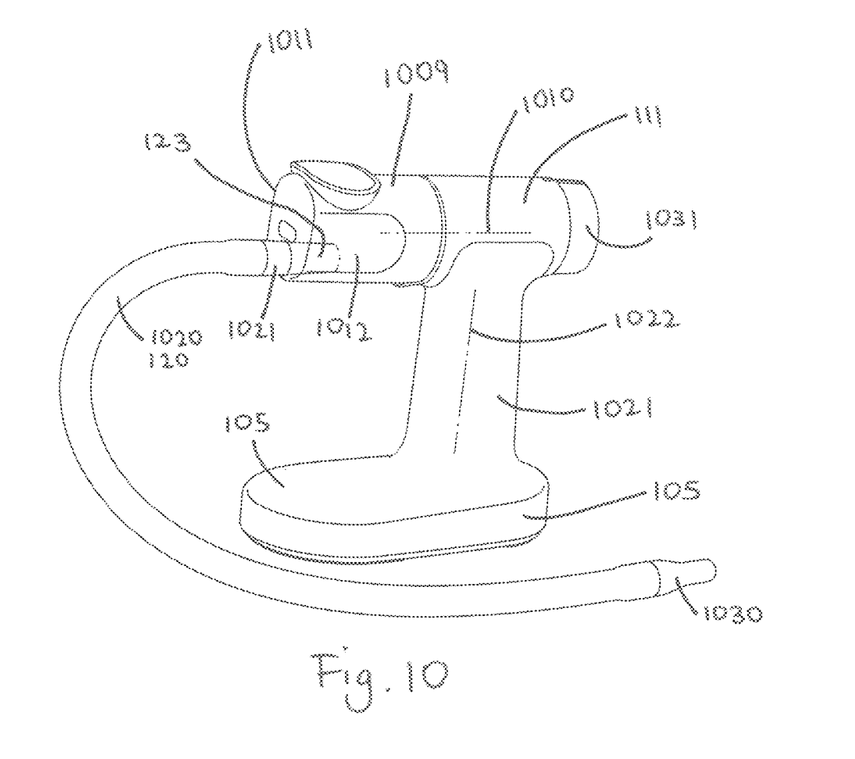
FIG. 10 is a perspective view of a smoker gun and hose.

A removable barrel 107 has bayonet features or parts 108 at one end. These parts engage with cooperating bayonet parts 109 formed into a barrel receiving rim 104 at an annular end extremity 162 of the body portion 111, that is the front-most part of the appliance's upper body 240. The barrel 107 installs onto the body portion 111 with a twisting motion about the longitudinal central axis 110 that engages the bayonet parts 108, 109, so that the body portion 111 and barrel 107 provide a body assembly. In some embodiments, the cross-section of the barrel 107 is not uniformly circular. As shown in FIG. 10, the barrel 1009 is oval or elliptical in cross-section and can be provided with flat (or flatter) sides 1012 generally parallel to the longitudinal axis 110. By making the cross section of the barrel 1009 non-circular, the user's grip on the barrel 1009 is improved during assembly and disassembly.

As further shown in FIG. 1, the body portion 111 contains an axially aligned electric motor 112. The motor 112 is powered by batteries 114, for example, located within the base 105 or grip 102 (or both). The motor 112 operation and motor speed may be user controlled by a rotating knob controller 115 located at the rear of the body portion 111 and above the grip 102. In this example and for compactness, the diameter of the knob 115 is slightly smaller than or flush with the rear surface 116 that it is adjacent to. The motor 112 speed may also be controlled by a variable speed adjusting trigger controller mechanism 117, or thumb controllers 118 or otherwise.

The motor 112 has a shaft 120 that protrudes from the body portion 111. In the examples illustrated, the shaft 120 is central to the axis 110 of the upper body 240, continuous with the barrel 107. The shaft 120 drives an impeller (air flow generator) 121. The impeller 121 is installed completely outside of and unobstructed by the body portion 111. The motor 112 and impeller rotate about the axis 110. An intake passage 140 and an exhaust passage 123 for the impeller 121 are contained in the barrel 107. The smoke from the combustion of the contents of a mixing chamber 122 is drawn into the centre of the impeller 121. The impeller 121 exhausts into a discharge passageway 123. An accumulation space or reservoir 126 is formed below the impeller 121. The barrel 107 forms a case or covering for the impeller 121, shrouding it and providing all required airflows.

The intake passage 140 and exhaust passage 123 provide an air flow path 159 extending from the inlet opening 160 to the outlet opening 161 that cooperates with the impeller 121 to provide for the flow of air from the inlet 160 to the outlet 161, while drawing smoke in through the opening 155.

The lowest part or floor 127 of the exhaust passage 123 inclines downward from the impeller 121 when the appliance is hand held. When the appliance 100 is resting on a flat generally horizontal surface 163, condensed smoke in the form of resinous liquids flow from the outlet opening 161 of the passage 123 toward the reservoir or reservoir area 126 (portion of the passage 123) located at the inner end of the passage 123 and adjacent the impeller 121. The foot (base) 106 has a surface 164, that is engaged with the generally horizontally oriented surface 163, so that the appliance 100 can rest on the surface 163 and extend upwardly therefrom. When mounted on the surface 163 the axis 110 is inclined to the horizontal by an acute angle 164. When so mounted, the reservoir 126 is positioned below the impeller 121, and is at least partly lower than the outlet opening 161. The reservoir 126 is spaced further from the axis 110 than the impeller 121. The reservoir 126 behaves as a dam and is intended to keep the accumulated resin (shown as shaded) below the level of the circumferential O-ring or other seal 129 that isolates the body portion 111 and the interior of the body portion 111 from resin in the barrel 107. The reservoir 126 is preferably below the impeller 121. The seal 129 at least inhibits smoke leaving the flow path 159 adjacent the impeller 121. The reservoir 126 may be formed by the slope of the floor 127 or recessed features of the floor 127.

As best seen in FIG. 1, the end extremity 162 projects into the barrel 107 so as to be surrounded thereby. The seal 129 is located between the end extremity 162 and the barrel 107 to at least aid in heat insulating the body 112 from the barrel 107.

The intake passage 140 has its major direction of extension generally parallel to the axis 110. Preferably, the exhaust passage 123 has its major direction of extension generally parallel to the axis 110 but diverges from the axis 110 away from the impeller 121.

The axis 108 of the grip 102 is generally transverse of the axis 110 so that the grip 102 provides a "pistol grip" for the appliance 100.

Figure 4:
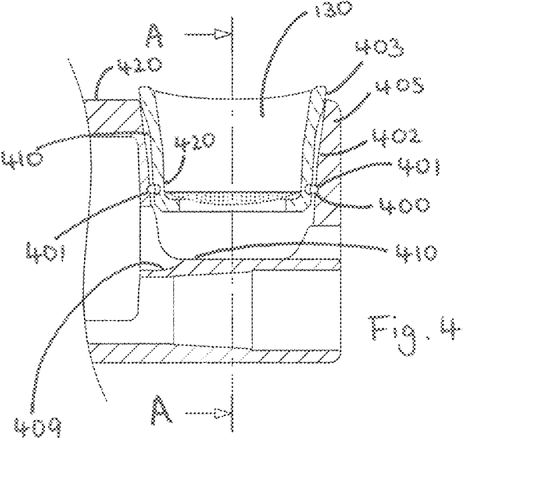
FIG. 4 is a cross-sectional view of a barrel and combustion chamber.

An optionally removable combustion container or bowl 130 is received by a vertically oriented port 131 in the removable barrel 107. The bowl 130 may have cylindrical or tapered funnel-like exterior sidewalls 148 that are received within the bore of the port 131. The port 131 is surrounded by a body wall 157. The result is a generally continuous cylindrical air space 150 between the sidewalls 148 of the bowl 130 and the bore of the port 131. The air pocket provided by the space 150 serves as thermal insulation between the area of the rim 403 and the area of the clip 135. The bowl 130 forms the insulation space 150 when inserted is shown in FIG. 4.

In FIG. 1, bowl 130 has a perforated floor 136 that discharges combustion products into the mixing chamber 122. The floor 136 has an opening 155. The chamber 122 has a fresh air intake 140. The mixture of air and combustion products are drawn into the centre of the impeller 121. The bowl 130 has a space 156 that receives a product to be burnt to produce smoke.

Figure 2:
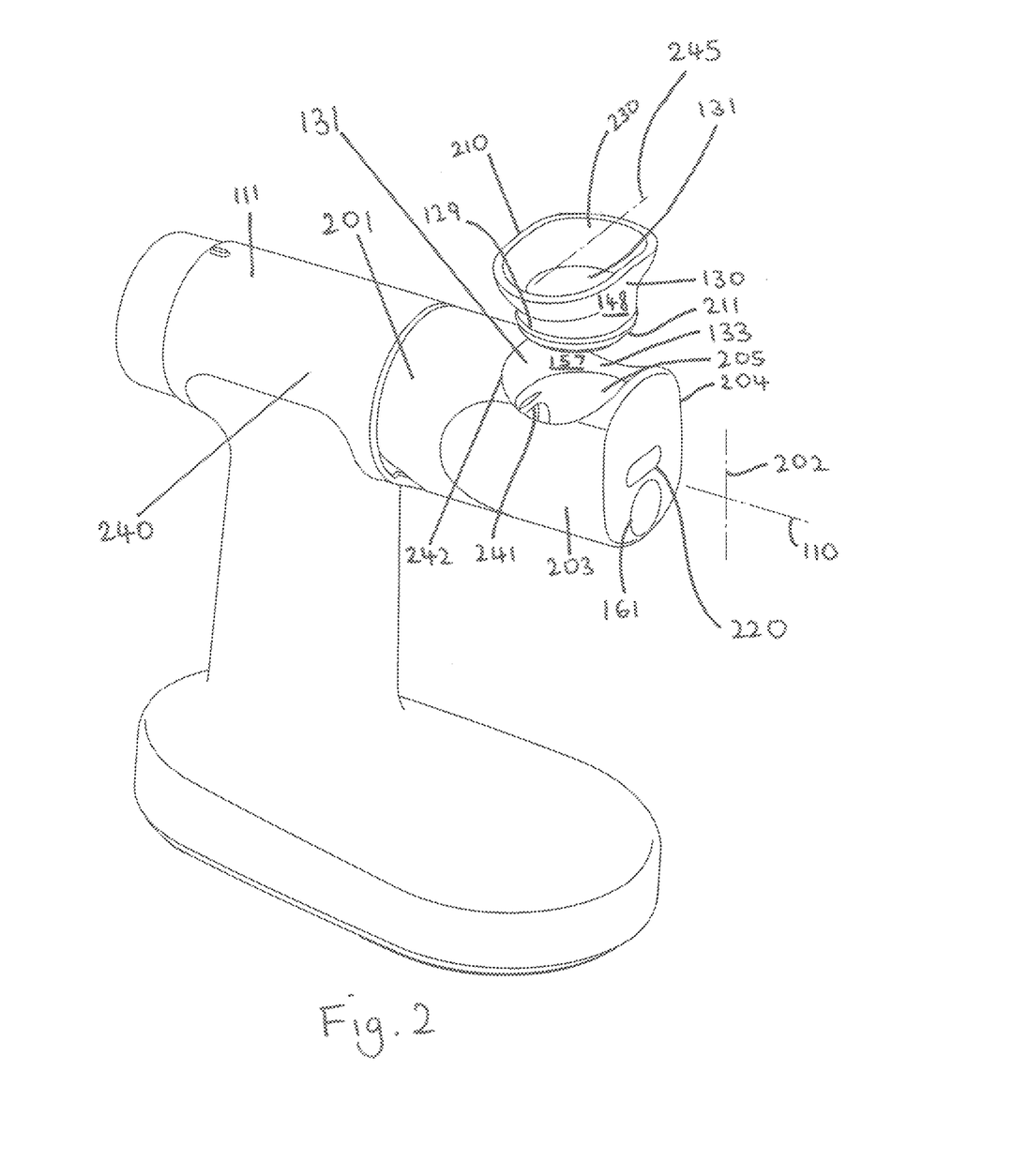
FIG. 2 is an exploded perspective of the smoker gun shown in FIG. 1.

In the embodiment of FIG. 2, one end of the barrel 201 may be generally round and approximately flush with the upper body 240. The barrel 201 is generally concentric with the fan and motor relative to the axis 110. A far end 204 of the barrel 201 is shown as being an oval, in cross-section. Grip on the barrel 201 is improved when a portion of the barrel 201 is non-circular. The blending between the circular and non-circular ends may be gradual and may include flat or curved planes 203.

The barrel 201, in the installed position depicted in FIG. 2, has a radial port 205 that receives the combustion bowl 130. In this example, the combustion bowl 130 is funnel shaped; the circumference 210 of the rim of the bowl 130 is greater than the diameter 211 of the bowl's discharge end 211. In this example, the discharge end 211 is cylindrical or tapered, fitting removably within the port 205. The port 205 is preferably formed close to the far end 204 of the barrel 201, to distance the bowl 130 from the body portion 240 and the passage 123. The far end 204 of the barrel 201 has an optional intake opening 220 that leads to the mixing chamber 122. The discharge opening 161 is located below and generally parallel with the air intake 220 (FIG. 2), 140 (FIG. 1).

Figure 3:
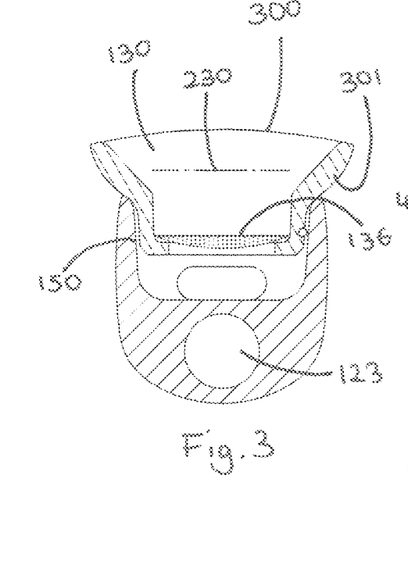
FIG. 3 is a cross-sectional view of a barrel and combustion chamber.

As shown in FIGS. 2 and 3, the upper rim 300 of the chamber 130 is elongated along an axis 245 that is transverse relative to the axis 110. By making the upper rim 300 of the bowl 130 elongated along the axis 245, the lobes or ears 230 make the bowl 130 easy to grip, rotate, install and remove. The configuration also provides visual cues for the user to assemble the bowl 130 in the correct orientation defined by cooperating lateral contours 241 formed by the port's rim or opening 242.

As shown in the example of FIG. 4, a metal clip 400 is carried in a circumferential groove 420 around a lower part of the bowl 130. The clip 400 removably engages a pair of opposed grooves 401 (see 903, 904 in FIG. 9) formed at a lower end of the bore 402. A substantial portion of the working volume of the bowl 130 is below the level of the exterior upper surface of the barrel 420. A circumference edge 403 of the container makes sliding contact with or is closely adjacent to the circumferential rim 405 of the opening 205. This creates the aforementioned cylindrical space 410 for air that insulates the bowl 130 from the barrel 420 between the rim 405 and the clip 400.

Figure 5:
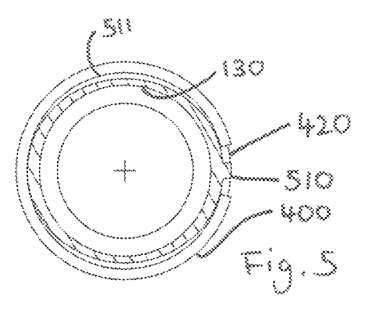
FIG. 5 is a cross-section through a clip that interconnects a body and a combustion chamber.

As shown in the cross-section depicted in FIG. 5, the flexible retention clip 400 may be round in cross-section. The clip 400 in this example is 'C' shaped. It is trapped in a groove in the lower part of the bowl 130. A nib or protrusion 510 in the groove 420 prevents the clip 400 from rotating in the groove. Opposing slots 401, 903, 904 toward the bottom of the bore 402 engage parts of the clip 400 that protrude slightly from the container 130. The clip 400 only engages with the slots 401 in the bore 402 when the bowl 130 is fully installed in the barrel 420 and the clip 400 expands into the slots 401. The clip 400 can flex slightly when urged manually into and out of engagement with the slots 401. Additionally, the clip 400 acts as a detent and guide or running surface to assist movement into and out of the grooves 903, 904. The interior sidewalls of the port 131 may be out of round so as to create gaps to assist air flow 511.

Figure 6:
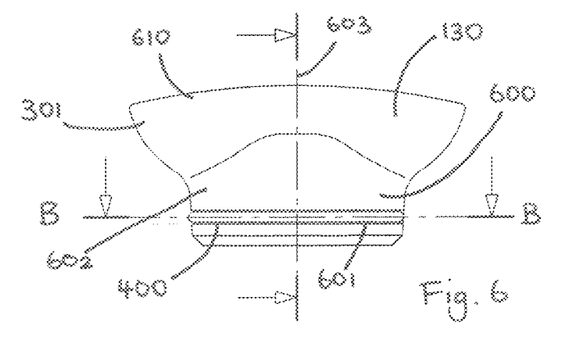
FIG. 6 is a side elevation of a combustion chamber.

As seen in FIG. 6, the neck 600 of the bowl 130 is preferably round and has a circumferential groove 601, 420 for the clip 400. Although generally cylindrical, the outside surface 602 of the neck area may be slightly tapered with respect to the central vertical axis 603. The bore 402 of the port 205 may be similarly tapered, as shown in FIG. 4. FIG. 6 also illustrates the bi-lateral symmetry of the bowl 130. In this example, the upper rim 610 is oval or elliptical in plan view, providing for extensions or wings 301. The wings 301 provide extra capacity, favourable airflow characteristics and make for convenient handling.

Figure 7:
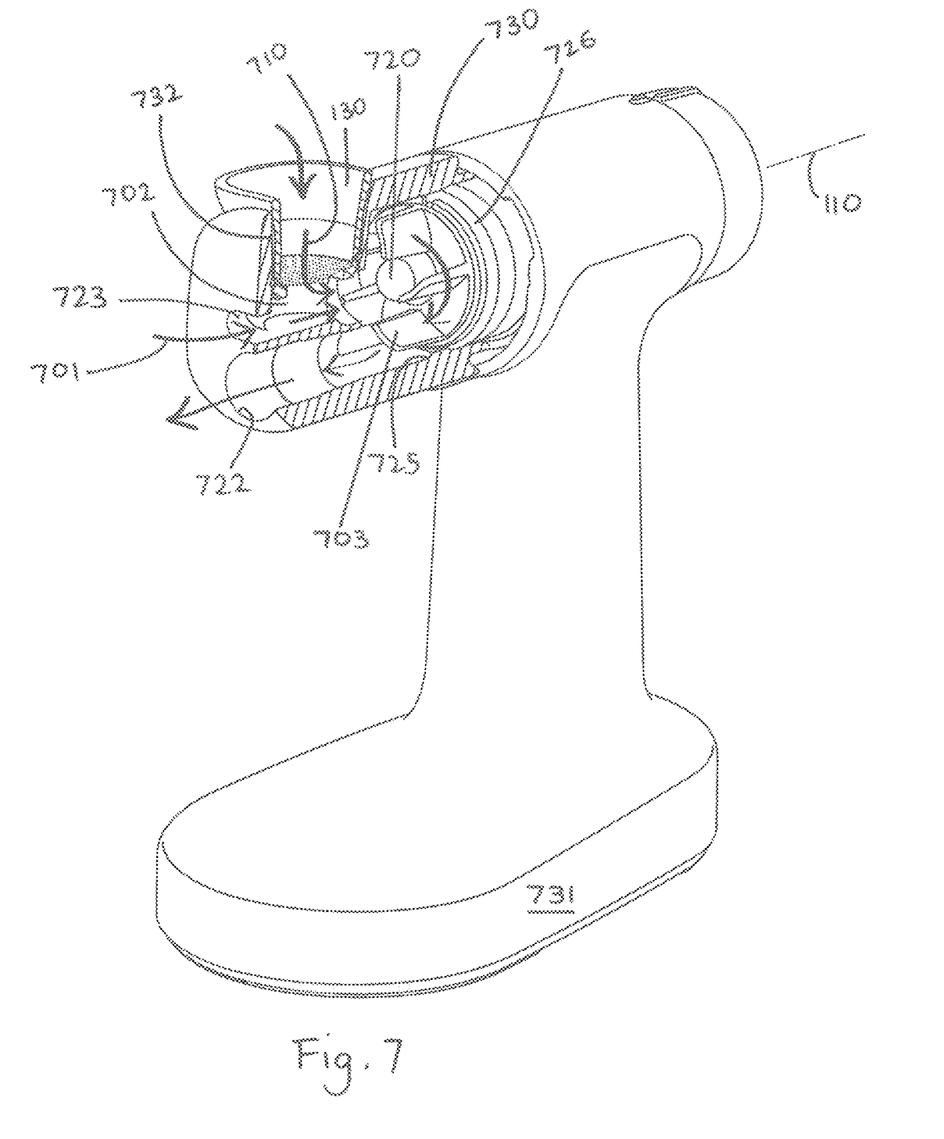
FIG. 7 is a perspective view of the smoker gun shown in FIGS. 1 and 2, partially broken away to show an airflow.

As shown in FIG. 7, air is drawn through the removable bowl 130. Combustion products 710 combine with external air 701 in a mixing chamber 702. The mixture continues to mix as it is drawn into a centre void region 703 of a rotating impeller 720. The mixture of combustion products and air is ejected by the impeller into the discharge passageway 720, 123. The passageway has a discharge opening 722 at the far end of the barrel 730.

In order for the resinous liquids in the appliance 100 to flow toward the reservoir 725, the floor or low part of the discharge passageway 720 must slope down when the appliance 100 is resting on the base 731. The reservoir 725 accumulates fluid in an area directly below the entire length of an impeller blade. The depth of the reservoir 725 is determined by the distance between the bottom of the reservoir 725 and the seal 726.

The fresh air inlet opening 723 is axially aligned with the adjacent mixing chamber 702 and preferably located above the discharge opening 722. In addition to the insulating air layer 732 between the bowl 130 and the barrel 730, the length of the barrel allows the container to be spaced away from plastic parts, particularly those of the body portion 111. The discharge opening 722 may be configured to receive an extension hose. In FIG. 10, an extension hose 1020 and optional hose adaptor or male fitting 1021 are shown after having been inserted into the discharge opening or female fitting 722.

In some preferred embodiments, air is intentionally drawn into the barrel through an air pathway that completely or almost completely surrounds the lower part of the combustion bowl. This flow path around the hottest part of the combustion bowl beneficially cools the combustion bowl and the surrounding area of the port. FIGS. 7A-7G illustrate examples of cooperation between the combustion bowl and the port.

Figure 7A:
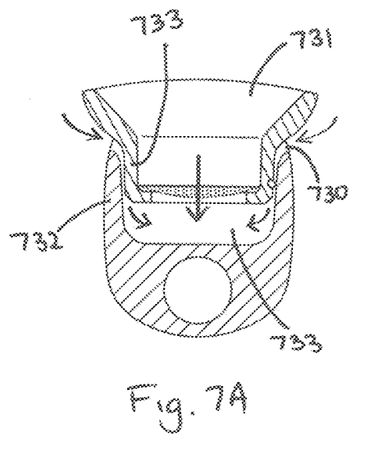
FIG. 7A is a cross-section of a chamber and a barrel.

As shown in FIG. 7A, a gap 730 is created between a combustion container 731 and the upper rim 732 of the port. Air travels along and around the lower part 733 of the mixing chamber and can be mixed with combustion products in a chamber 733 below the combustion container 731. As illustrated by FIG. 5, the clip or fastener 400 need not obstruct the air flow coming from the gap 730.

Figure 7B:
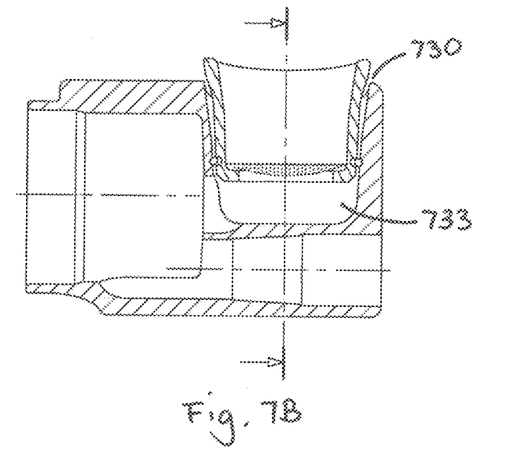
FIG. 7B is a cross-section of an air gap and flow pathway between a combustion chamber and a port.

When this air flow around the bowl 731 is adequate, the mixing chamber 733 need not be provided with a separate or front-facing air intake. This arrangement is shown in FIG. 7B.

Figures 7C, 7D:
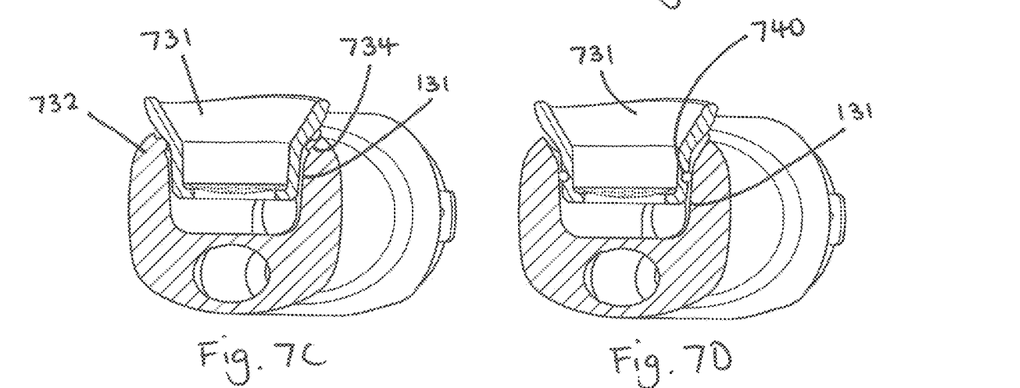
FIG. 7C illustrates the use of stand-offs between a combustion chamber and port.
FIG. 7D illustrates the use of a polymeric O-ring to engage a port.
Figure 7E:
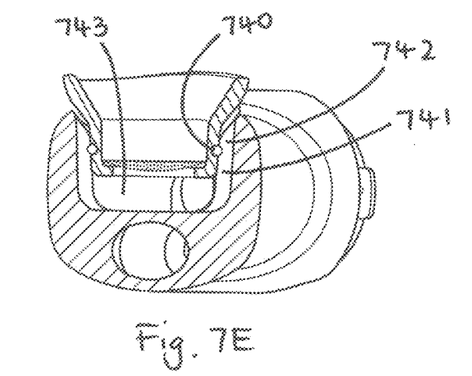
FIG. 7E is a cross-section illustrating a polymeric O-ring that engages but does not seal against a port.
Figure 7F:
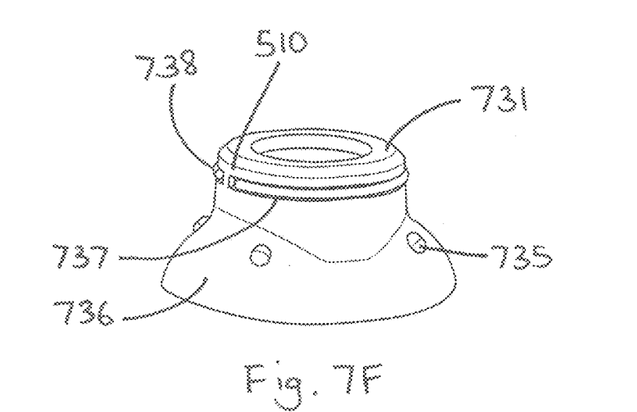
FIG. 7F is a perspective view of a combustion chamber illustrating groove, clip and stand-offs.

As shown in FIG. 7C, correct location of the container 731 in the port may be stabilised by providing stand-offs 734 in the form of bumps, ribs, protrusions or scallops around the upper rim 732 of the port 131. As shown in FIG. 7F, protrusions or the like 735 can also be located on the shoulders 736 of the container 731. FIG. 7F also illustrates the circumferential groove 737, 420 and the interruption to it 510 for retaining the round wire "C"-shaped clip 738, 400.

FIG. 7D illustrates a simplified engagement between the container 731 and the port 131. In this example, a polymeric O-ring 740 retains the container 731 but preferably does not seal it against the port. One way of avoiding an air seal between the container and the port is depicted in FIG. 7E. Here, waves, grooves, fins or slots 741 are formed along the length of the port. The resulting flutes 742 allow air to pass past the polymeric seal 740. The flutes 741 lead into the mixing chamber 743.

Figure 7G:
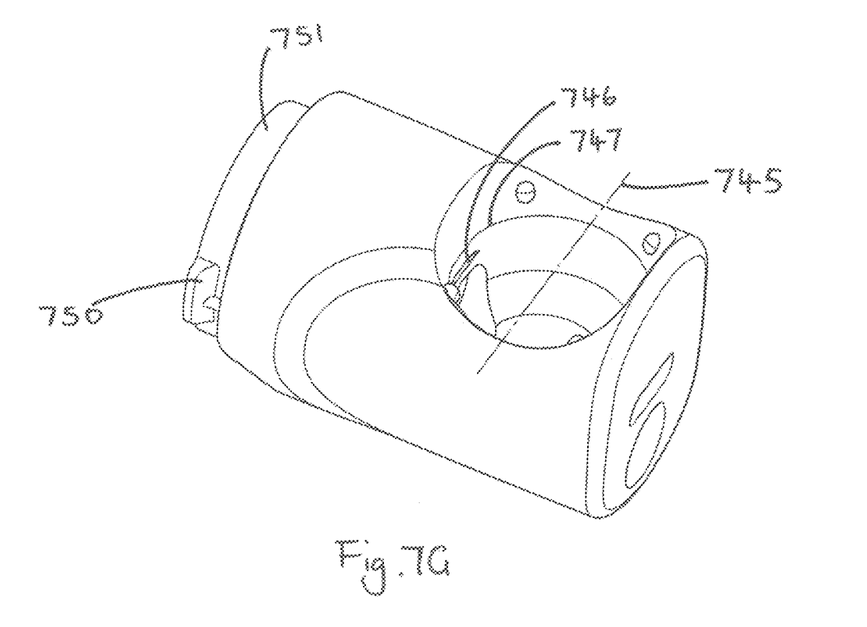
FIG. 7G is a perspective view of the barrel.

FIG. 7G illustrates a slight elongation of a port along a lateral axis 745. The flexible clip 738, 400 is compressed by the inner side walls of the port but substantially relaxes when the clip enters the opposed slots 746. The interior side wall of the port may be tapered, bevelled or radiused 747 to make the container easier to insert. FIG. 7G also illustrates the barrels' male bayonet features 750 formed on a shoulder 751. In this example, the cylindrical shoulder 751 is smaller in diameter than the rear part of the barrel from which it extends.

Figure 8:
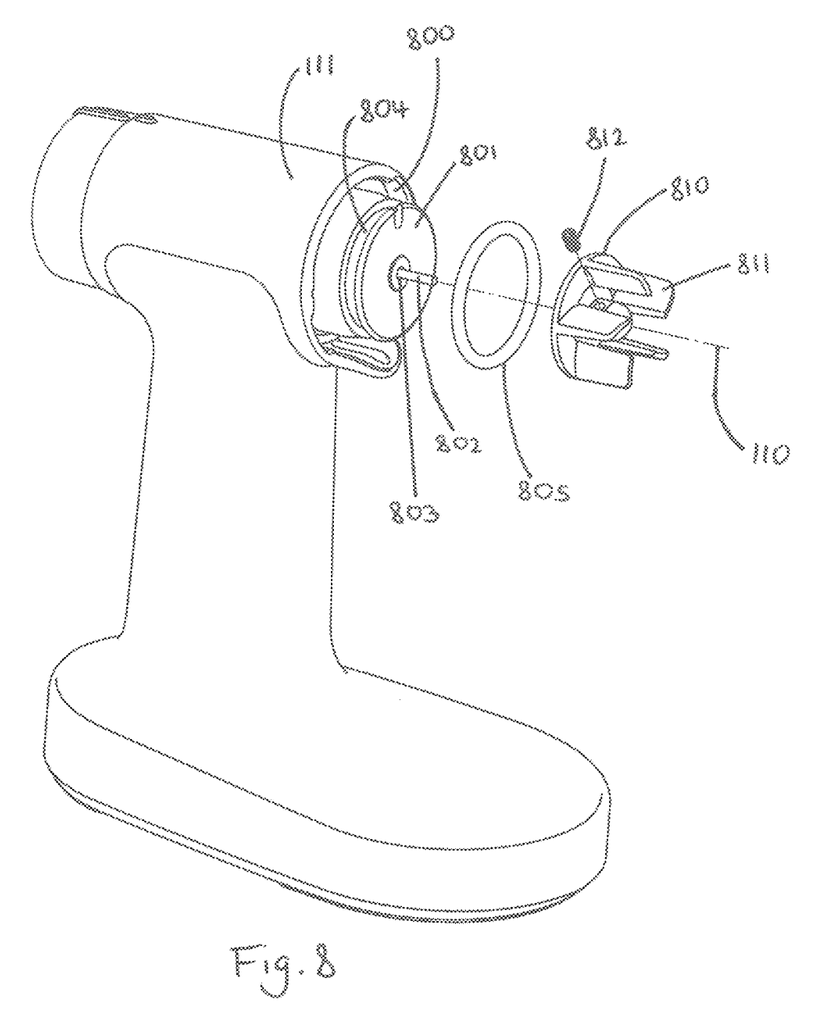
FIG. 8 is an exploded perspective of a body having a motorised fan that drives an impeller.

As shown in FIG. 8, the body portion 111 has internal bayonet features 800 that cooperate with external bayonet features on the barrel 107. The body portion 111 also includes a motor housing portion 801 that extends past or protrudes from the bayonet features 800. The motor's shaft 802 extends through a sealed opening 803 in the motor housing portion 801. An outside of the motor housing portion 801 has an external circumferential groove 804 that receives a polymeric seal ring 805. The seal ring 805 is behind the shaft seal area 803 but forward of the remainder of the body portion 111 and any access to the interior of the body portion 111. In this example, an impeller 810 with radial blades 811 is affixed to the motor shaft 802 with a set screw or other fastener 812. The impeller is outside of and unobstructed by the body portion 111.

Figure 9:
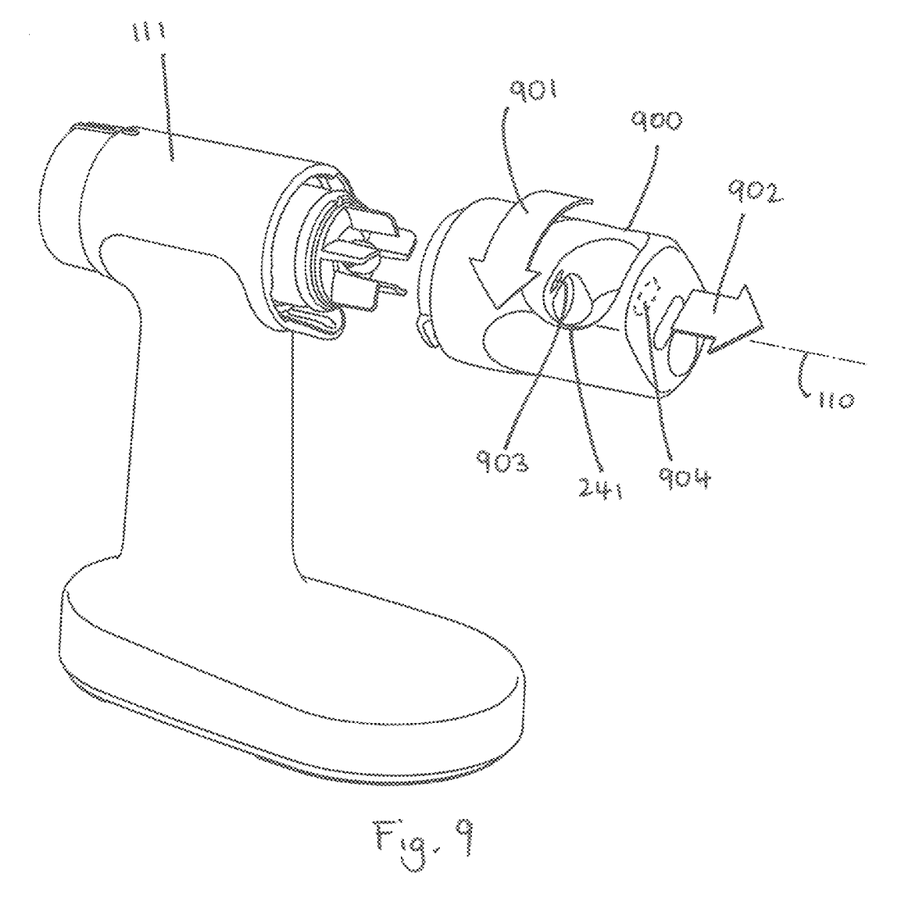
FIG. 9 is a perspective view showing the removal of the barrel.

As shown in FIG. 9, the barrel 900 is removed from the body portion 111, preferably by rotating it in a counter clockwise direction 901 and withdrawing it axially 902. FIG. 9 also illustrates a retaining clip groove 903 in the port's bore. A similar groove 904 is located diametrically opposite, and formed into the internal surface of the bore. It will be appreciated that many methods may be used to removably associate the combustion bowl 130 with the barrel.

An assembled smoking appliance 100, embodied as a smoke gun 101, is shown in FIG. 10. The gun 101 is shown resting flat on its base 105. It can be seen that the long axis 1010 is elevated and inclined from the horizontal underside of the base 105. The discharge passageway 123 or at least the floor of it is inclined downwardly, the lowest point being toward the main body. Preferably, fluids within the barrel collect at the bottom of the discharge passageway and below the impeller. This reservoir is isolated from the main body by an adjacent polymeric seal that extends between the barrel and the main body. In the orientation depicted in FIG. 10, the long axis 1022 of the grip area 1021 is slightly reclined from the vertical and the base 105 extends in the same direction as the barrel 1009. With the base 105 on a resting surface or the grip in the hand of the user, the nozzle 1030 or the end of the hose 1020 may be inserted into a vessel or container containing a food to be smoked. The rotational rate of the fan and therefore the airflow can be controlled by a rear-facing adjustment knob 1031 or otherwise.

Although the invention has been described with reference to specific examples, it will be appreciated by those skilled in the art that the invention may be embodied in many other forms.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

The invention claimed is:

1. A smoker appliance comprising:
    a body assembly providing an air flow path extending between an air inlet opening and an air outlet opening;
    a combustion bowl removably mounted in the body assembly, the bowl having a combustion space to receive material to be burnt to provide smoke, and the bowl having a bowl opening providing for the flow of smoke from the combustion space to the path; and
    a motor and air flow generator mounted on the body assembly, the air flow generator being operable to cause air to pass along the path from the inlet opening to the outlet opening and thereby draw smoke from the combustion space into the path for delivery to the outlet opening;
    wherein the bowl has a side wall, and the body assembly has a side wall that surrounds a port within which the bowl is removably received, with the body assembly side wall and bowl side wall being spaced so as to provide an insulation space between the body assembly side wall and the bowl side wall to inhibit the transfer of heat from the bowl to the body assembly,
    wherein the bowl has an upper rim and a floor, the side wall and the floor of the bowl defining the combustion space, and at least a portion of the upper rim extends beyond the port, and
    wherein the body assembly further comprises:
        a body portion within which the motor is located, the body portion having a grip configured to be engaged by a user, the grip having a longitudinal axis that is generally transverse to a rotational axis of the motor and air flow generator, and
        a barrel attached to the body portion, with the barrel having the port, flow path, inlet opening and outlet opening,
    wherein the flow path includes a first passage extending from the inlet opening to the air flow generator, and a second passage extending from the air flow generator to the outlet opening, with each of the passages having a major direction of extension generally parallel to said rotational axis.

2. The appliance of claim 1, wherein the insulation space surrounds the bowl.

3. The appliance of claim 1, wherein the appliance includes a clip releasably securing the bowl to the body wall.

4. The appliance of claim 1, wherein the barrel is removably attached to the body portion.

5. The appliance of claim 4, wherein the body portion has a longitudinal axis, with the barrel moved angularly about said axis for attachment and removal with respect to the body portion.

6. The appliance of claim 1, wherein a seal connects the body portion and the barrel to at least inhibit smoke escaping from the air flow path.

7. The appliance of claim 1, wherein the insulation space communicates with the first passage to provide for air flow through the insulation space to the first passage.

8. The appliance of claim 1, wherein the appliance has a base upon which the appliance can rest on a generally horizontal surface, so as to extend upwardly from the horizontal surface with the second passage having a portion adjacent the air flow generator, and with the second passage portion being located below the air flow generator.

9. The appliance of claim 8, wherein the second passage portion is located at least partly lower than the outlet opening, when the appliance is resting on the generally horizontal surface.

10. The appliance of claim 1, wherein the bowl opening communicates with the first passage.

11. The appliance of claim 1, wherein the bowl is integrally formed.

* * * * *